United States Patent
Choi et al.

(10) Patent No.: US 9,903,721 B2
(45) Date of Patent: Feb. 27, 2018

(54) METHOD FOR TRANSFERRING ROUTE AND DEVICE THEREFOR

(71) Applicant: LG ELECTRONICS INC., Seoul (KR)

(72) Inventors: Jaehyuk Choi, Seoul (KR); Hongbeom Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/759,384

(22) PCT Filed: Jan. 13, 2014

(86) PCT No.: PCT/KR2014/000360
§ 371 (c)(1),
(2) Date: Jul. 6, 2015

(87) PCT Pub. No.: WO2014/109616
PCT Pub. Date: Jul. 17, 2014

(65) Prior Publication Data
US 2015/0338220 A1 Nov. 26, 2015

Related U.S. Application Data

(60) Provisional application No. 61/751,925, filed on Jan. 13, 2013, provisional application No. 61/869,756, (Continued)

(51) Int. Cl.
*G01C 21/26* (2006.01)
*H04L 29/08* (2006.01)
(Continued)

(52) U.S. Cl.
CPC ......... *G01C 21/26* (2013.01); *G01C 21/3438* (2013.01); *G01C 21/36* (2013.01);
(Continued)

(58) Field of Classification Search
CPC ........ G01C 21/26; G01C 21/34; G01C 21/36; H04L 67/32; G06Q 10/047; G08G 1/096844; G08G 1/096816
See application file for complete search history.

(56) References Cited

U.S. PATENT DOCUMENTS 7,565,155 B2 * 7/2009 Sheha .................... G01C 21/26
340/992
8,107,608 B2 * 1/2012 Sheha .................... G01C 21/26
379/201.06
(Continued)

FOREIGN PATENT DOCUMENTS

CN 1409088 A 4/2003
CN 1521484 A 8/2004
(Continued)

OTHER PUBLICATIONS

Wikipedia article, Uniform Resource Locator, printed May 25, 2016.*

*Primary Examiner* — Redhwan K Mawari
*Assistant Examiner* — Alan D Hutchinson
(74) *Attorney, Agent, or Firm* — Dentons US LLP

(57) ABSTRACT

A method for transferring a route of a trip identified by departure and destination which are calculated by a server to a third terminal, according to one embodiment of the present invention, is performed by a terminal, and the departure is a position of the third terminal defined as an identifier (Id) of the third terminal, and the destination is a current position of the terminal. The method comprises the steps of: requesting a server to transfer a route to the third terminal, wherein the route is transferred to the third terminal according to the request for the route transfer; requesting registration in a notification service with respect to the third terminal to the server, wherein the notification service is set in order to notify the terminal that a specific operation of the third (Continued)

terminal is performed if the specific operation is performed; receiving, from the server, a notification for indicating that the specific operation of the third terminal is performed, when the specific operation of the third terminal is performed; and transmitting an updated position of the terminal to the server when the terminal moves from a previously reported position to a predetermined distance, if the notification indicates that the third terminal has requested reception of update information with respect to the route.

12 Claims, 6 Drawing Sheets

Related U.S. Application Data filed on Aug. 25, 2013, provisional application No. 61/873,372, filed on Sep. 4, 2013, provisional application No. 61/899,300, filed on Nov. 4, 2013, provisional application No. 61/903,416, filed on Nov. 13, 2013, provisional application No. 61/905,160, filed on Nov. 16, 2013, provisional application No. 61/917,320, filed on Dec. 17, 2013.

(51) Int. Cl.
| | | |
|---|---|---|
| *G01C 21/36* | (2006.01) | |
| *G06Q 10/04* | (2012.01) | |
| *G01C 21/34* | (2006.01) | |
| *G08G 1/0968* | (2006.01) | |

(52) U.S. Cl.
CPC .......... *G06Q 10/047* (2013.01); *H04L 67/32* (2013.01); *G08G 1/096816* (2013.01); *G08G 1/096844* (2013.01)

(56) References Cited

U.S. PATENT DOCUMENTS

| | | | |
|---|---|---|---|
| 9,094,799 B2* | 7/2015 | Kwon | H04W 4/046 |
| 2005/0137797 A1 | 6/2005 | Oesterling et al. | |
| 2008/0170679 A1 | 7/2008 | Sheha et al. | |
| 2009/0276154 A1* | 11/2009 | Subramanian | G01C 21/3438 701/469 |
| 2010/0241346 A1 | 9/2010 | Waris | |
| 2011/0046878 A1* | 2/2011 | Sung | G01C 21/28 701/467 |
| 2011/0166780 A1* | 7/2011 | Hjelm | G01C 21/20 701/533 |

FOREIGN PATENT DOCUMENTS

| | | |
|---|---|---|
| CN | 101150856 A | 3/2008 |
| CN | 101848428 A | 9/2010 |
| CN | 102147810 A | 8/2011 |
| CN | 102440011 A | 5/2012 |
| EP | 1298621 A2 | 4/2003 |
| KR | 10-2005-0033900 A | 4/2005 |
| KR | 10-2010-0064937 A | 6/2010 |
| KR | 10-2010-0068606 A | 6/2010 |
| KR | 10-2010-0071676 A | 6/2010 |
| KR | 10-2010-0091668 A | 8/2010 |

* cited by examiner

METHOD FOR TRANSFERRING ROUTE AND DEVICE THEREFOR

This application is a National Stage Entry of International Application No. PCT/KR2014/000360, filed on Jan. 13, 2014, and claims the benefit of U.S. Application Ser. Nos. 61/751,925, filed on Jan. 13, 2013; 61/869,756, filed on Aug. 25, 2013; 61/873,372, filed on Sep. 4, 2013; 61/899,300, filed on Nov. 4, 2013; 61/903,416, filed on Nov. 13, 2013; 61/905,160, filed on Nov. 16, 2013; and 61/917,320, filed on Dec. 17, 2013, all of which are hereby incorporated by reference in their entirety for all purposes as if fully set forth herein

TECHNICAL FIELD

The present invention relates to a method for delivering a route and a device therefor, and more particularly, to a method for delivering a route calculated by a server to another entity and a device for the same.

BACKGROUND ART

Conventionally, a navigation terminal detects its current location, that is, an origin of a trip through a Global Positioning System (GPS) connection, receives information about a destination of the trip from a user, and internally calculates a route based on the origin and the destination. Along with the recent proliferation and increased performance of smartphones, services have become popular, in which a traffic and route information providing server provides route information, real-time traffic information related to routes, and other various information to Personal Navigation Devices (PNDs) over a mobile communication network.

Particularly in the situation where various navigation services are available, the Open Mobile Alliance (OMA) standardization organization is working on standardization of Dynamic Navigation Enabler (DynNav) that provides real-time traffic information by Peer to Peer (P2P) communication through an Internet Protocol (IP)-based network of a mobile communication network or a wireless network, rather than Traffic Protocol Expert Group (TPEG) information is transmitted over a Digital Multimedia Broadcasting (DMB) network that provides information in a broadcast signal. The standard considers a navigation terminal and a service type largely in two ways for a smartphone.

First, a traffic and route information providing server performs complex route computation, instead of a navigation application loaded in a smartphone, and indicates a calculated route to the smartphone. Second, owing to the improved performance of a smartphone, an application loaded in the smartphone performs or a navigation terminal equipped with a mobile communication modem performs route computation. In this case, the traffic and route information providing server does not provide route information. Rather, once the terminal registers a calculated route to the server, the terminal can receive from the server only real-time traffic information related to the registered route in a customized manner by IP-based P2P communication, not in a conventional broadcast signal.

FIG. 1 illustrates Navigation Device (ND) types. NDs may be classified into a type 110 that additionally provides TPEG-based traffic information transmitted through a broadcasting network such as a DMB network, a type 120 that additionally provides traffic information in an IP-based manner, for example, over a mobile communication network or a Wireless Fidelity (Wi-Fi) network, and a standalone type 130 that tracks the location of a vehicle through a GPS connection without connecting to other communication media, generates route information, and provides the route information.

DynNav under standardization in the OMA LOC WG belongs to the type 120 that provides IP-based traffic information, specifically by P2P communication. The following two types of NDs are defined in DynNav.

1. Smart ND: a device that can calculate a route on its own and thus requests only real-time traffic information to a DynNav server without receiving route information from the DynNav server.

2. Lightweight ND: a device that cannot calculate a route on its own and thus requests all real-time traffic information including route information to a DynNav server.

Since traffic information is requested and provided in a RESTful-based manner in a conventional DynNav system, the following route information formats are used and each information format can be defined by XML Schema Definition (XSD).

1) Trip Structure: a terminal initially acquires basic information such as an origin and a destination from a user, for route setting, and provides the acquired information to a server. The trip structure includes subsets corresponding to a plurality of route structures. The trip structure may include following elements listed in Table 1.

TABLE 1

| Element | Type | Optional | Description |
|---|---|---|---|
| originWGS84 | Location_Point | Choice | Location_Point structure is defined in tpeg-locML [TTI LOC]. At least one element originWGS84 or originAddress MUST be specified when Trip resource is created. This element is mandatory when the Trip resource is read by the client. This field can be used to indicate the assumed current position of the client, enabling route information updating procedure on the server. |
| originAddress | Civic Location Format | Choice | Civic Location Format is defined by IETF [RFC 5139]. At least one element originWGS84 or originAddress MUST be specified. |
| destinationWGS84 | Location_Point | Choice | Location Point structure is defined in tpeg-locML [TTI LOC]. At least one element destinationWGS84 or destinationAddress or destionation3rdParty MUST be specified when Trip resource is created. This structure is |

TABLE 1-continued

| Element | Type | Optional | Description |
|---|---|---|---|
| destinationAddress | Civic Address | Choice | mandatory when the Trip resource is read by he client. Civic Location Format is defined by IETF [RFC 5139]. At least one element destinationWGS84 or destinationAddress or destination3rdParty MUST be specified when Trip resource is created. This structure may be provided by the server in case the user defines a destination using destinationWGS84 or destionation3rdParty structures. |
| destination3rdParty | xsd:string | Choice | One element among destinationWGS84, destinationAddress, or destionation3rdParty MUST be specified when Trip resource is created. |
| thirdPartyIDType | ThirdPartyIDType List | Yes | Inditae which type of the thirdparty ID is used in origin3rdParty or destination3rdParty. If destination3rdParty exists, thirdPartyIDType shoud exist. |
| waypoints | Location_Point [0 . . . unbounded] | Yes | Location_Point structure is defined in tpeg-locML. |
| startingTime | xsd:dateTime | Yes | Starting time of the planned trip. If not present, current time is assumed. |
| tollRoad | xsd:boolean | Yes | If true or not present, toll road are allowed.) |
| vehicleType | Vehicle_Info | Yes | Vehicle_Info structure is defined in tpeg-rtmML |
| calculateRoute | xsd:boolean | Yes | If false or not present, server should not propose routes. |
| requestedEventsCategories | xsd:string [0 . . . unbounded] | yes | Categories of traffic information, related to the defined Trip, requested by the application. This field shall be encoded according to the list of values defined in the rtm00 table available in TTI RTM. If this field is not present, the server MUST provide traffic information for all defined categories (including network performance parameters). |
| link | common:Link [0 . . . unbounded] | Yes | Links to routes related to the trip. Attribute "rel" must be set to "Route". |
| resourceURL | xsd:anyURI | Yes | Self-referring URL. SHALL NOT be included in POST requests, MUST be included in responses to any HTTP method that returns an entity body, and in PUT requests.) |

2) Route Structure: a route structure is expressed as a plurality of segments as a way to represent total routes calculated using the trip structure. The route structure may include following elements listed in Table 2.

TABLE 2

| Element | Type | Optional | Description |
|---|---|---|---|
| travellingTime | xsd:float | Yes | Total travelling time (in minutes) for the route |
| distance | xsd:float | Yes | Total distance (in Km) of the route |
| origin | Location_Point | No | Location_Point structure is defined in tpeg-locML [TTI LOC]. |
| partialRouteInformation | xsd:boolean | Yes | If set to true, the Route is described with partial information: only changed segments sequence is provided with respect to a reference route. The reference route is defined in link field of this structure. The partial encoding schema MAY be used for full routes resources. If this field is absent or set to false, the route information is complete. |
| firstSegment | xsd:integer [0 . . . unbounded] | Yes | This field represents one or more index of the first segment in the reference route segments sequence to be replaced by partial route segments sequence. In a partial route, a sequence of deviations MAY be provided with respect to the reference route: for each deviation it is provided the index of the first segment in the reference route that has to be replaced by partial route segments sequence. This field is present only in case of partial route encoding schema (partialRouteInformation set to True) |

TABLE 2-continued

| Element | Type | Optional | Description |
| --- | --- | --- | --- |
| lastSegment | xsd:integer [0 . . . unbounded] | Yes | This field represents one or more index of the last segment in the reference route segments sequence to be replaced by the segments sequence of partial route. Only used for the partial route case.<br>In a partial route, a sequence of deviations MAY be provided with respect to the reference route: for each deviation it is provided the index of the last segment in the reference route that has to be replaced by partial route segments sequence.<br>This field is present only in case of partial route encoding schema (partialRouteInformation set to True). |
| numSegments | xsd:integer [0 . . . unbounded] | Yes | This field represents the number of segments that constitutes each single deviation of the partial route. Only used for the partial route information case.<br>In a partial route, a sequence of deviations MAY be provided with respect to the reference route: for each single deviation the number of describing segments is provided. The sum of the number of segment of each deviation should be equal to the number of segments provided in the partial route.<br>This field is present only in case of partial route encoding schema (partialRouteInformation set to True). |
| trafficEvents | CategorizedEvent ListReference [0 . . . unbounded] | Yes | List of traffic events as defined in tpeg-rtmML [TTI RTM], grouped into categories. |
| link | common:Link [0 . . . 2] | Yes | Link to reference route resource. Two reference route resources are present.<br>1) (Reference to the route for which it is proposed as alternative. Attribute "rel" must be set to "Route".)<br>2) Reference to the route for which the partial route information is referred. Attribute "rel" must be set to "ReferenceRoute". |
| resourceURL | xsd:anyURI | Yes | Self-referring URL. SHALL NOT be included in POST requests, MUST be included in responses to any HTTP method that returns an entity body, and in PUT requests. |

3) Segment Structure: it is a structure that represents each segment. The segment structure may define a real-time traffic state corresponding to the segment as well as the length of the segment, in TPEG. The segment structure may include following elements listed in Table 3.

TABLE 3

| Element | Type | Optional | Description |
| --- | --- | --- | --- |
| originPoint | Location_Point | Yes | This field represents the origin of the segment encoded according to Location_Point structure as defined in tpeg-locML.<br>In case segment structure is used for describing a route and this field is not present, the starting point of the segment should be assumed equal to the ending point of the previous segment, or the trip origin in case of the first segment of the route. In case of partial route, the origin of the first segment of each deviation is the ending point of the last valid segment in reference route. |
| endPoint | Location_Point | No | Location_Point structure as defined in tpeg-locML [TTI LOC]. The starting point of the segment should be assumed equal to the ending point of the previous segment (or the trip origin for the first segment)) |
| midwayPoint | Location_Point [0 . . . unbounded] | Yes | Location_Point structure as defined in tpeg-locML [TTI LOC] |
| polyLine | xsd:string | Yes | Polyline is used to describe the shape of a segment. This field is a string that contains a sequence of geographic points expressed in WGS84 coordinates. Each single point is encoded as a sequence of WGS84 Latitude, Blank (character), |

TABLE 3-continued

| Element | Type | Optional | Description |
|---|---|---|---|
| | | | WGS84 Longitude, Colon (character), Blank (character). The shape of segments is provided by the server if explicitly requested by the application. The level of polyline resolution is defined by the DynNav Server. When used in full route resource, the polyline resolution has to target a correct representation of segments on turn-by-turn navigation maps. In summarized route resource the resolution has to target the high level representation of the route on top of roads maps. Polyline example: 45.12345 7.009876, 45.12355 7.09866, . . .) |
| linkName | xsd:string | Yes | Name of the road that the segment belongs to |
| distance | xsd:float | Yes | Length of the segment in km |
| regularTravellingTime | xsd:float | Yes | Estimated regular time to drive through the segment in low traffic conditions, expressed in minutes |
| performanceParameters | PerformanceParameters [0 . . . unbounded] | Yes | This field contains performance parameters related to each segment. When segment structure is used to report network performance parameters for an area, a sequence of performanceParameters structure is included in the segment structure, providing information for the requested time interval and time resolution. |
| positionUpdate | xsd:boolean | Yes | If present and set to True, the application is requested to upload its current position when the Navigation Device enters this segment. |

4) Subscription List Structure: The subscription list structure may include following elements listed in Table 4.

TABLE 4

| Element | Type | Optional | Description |
|---|---|---|---|
| subscription | Subscription [0 . . . unbounded] | Yes | It may contain an array of Subscription. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

5) Subscription structure: The subscription structure may include following elements listed in Table 5.

TABLE 5

| Element | Type | Optional | Description |
|---|---|---|---|
| callbackReference | common:CallbackReference | No | Client's Notification endpoint and parameters. |
| link | common:Link [1 . . . unbounded] | No | References to resources subscribed by the application. Attribute "rel" indicates the type of resource subscribed. It may assume the following values: "Trip": in order to get notified about: new traffic events and performance parameter related to the set of routes defined for the trip new alternative route proposals "Area": in order to be notified of new traffic events and performance parameters updates Attribute "href" specifies the URL of subscribed resource. Subscribed resource's type must be the same of that specified in "rel" attribute, Note: notified information for an existing route are: |

TABLE 5-continued

| Element | Type | Optional | Description |
|---|---|---|---|
| | | | a) new traffic events provided with links included in the route resource itself; b) performance parameters available in updated performanceParameter filed of segment structures.) |
| trackingProc | xsd:boolean | Yes | If present and set to True, the application communicate to the server user's availability to provide position information through an external location application. |
| deviceLocationURI | xsd:anyURI | Yes | This parameter is used by the server for accessing Navigation Device position information. |
| tracking3rdParty | xsd:boolean | Yes | If present and set to True, the DynNav server tracks the $3^{rd}$ party position and notifies the availability of updated information when the $3^{rd}$ party position is changed. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

FIG. 2 is a diagram illustrating a signal flow for an operation of a lightweight ND in a conventional DynNav system. Because the lightweight ND does not support route calculation in view of its capability, the lightweight ND should request route information to a server and receive the route information from the server. The lightweight ND has the following main functionality.

The lightweight ND transmits trip information to the server, for use in route calculation at the server.

The lightweight ND receives information about a set of routes (including a recommended route) calculated by the server from the server.

The lightweight ND subscribes to a notification service to receive real-time traffic information from the server.

A description will now be given with reference to the flow diagram of FIG. 2.

1. A user of an application defines journey parameters and the application transmits the parameters to a server. The server calculates a set of proposed routes based on the received parameters using related traffic information. The server sends a created "trip" resource including the route identifiers of the proposed routes to the application as a response.

2. The application accesses the set of routes of a summarized format. This step is repeated with respect to all the routes proposed by the server. However, when the length and complexity of the trip are restricted or network quality is inappropriate, full format route information may be used in this step. The application may request shape information (a polyline of a WGS84 coordinate system) of the proposed routes unavailable in a navigation device.

3. The user selects one of the set of proposed routes and the application accesses the full format information of the route selected by the user. The application may request shape information (a polyline of a WGS84 coordinate system) of the proposed routes unavailable in a navigation device. When the full format route is acquired in step 2, this step is not required. The server sends the selected route information along with the related traffic information as a response.

4. The application accesses traffic events related to the route using links to provided traffic event resources. Access to the traffic events may be restricted to categories selected by the user.

5. The application removes unnecessary routes which were previously proposed by the server but were not selected by the user.

6. The application requests the server to create subscription to a notification service for the trip (route(s)). The server notifies the application of the following events.

a. update of performance parameters of all routes related to the trip and new traffic events (for the selected categories)

b. proposal of alternative routes due to traffic problems of routes to be used c. route to an updated destination and/or a third party when the destination of the trip is the position of the third party and the position of the third party is changed. For notification of this information, the application should request a procedure of tracking the position of the third party from the server upon subscription to the notification service.

7. When a vehicle (including the application) escapes from the used route and makes a detour, the application modifies an origin parameter of the trip resource. The server recognizes that the current position of the vehicle is not on the used route and calculates a new route using a new origin. The server sends an identifier of the new route as a response and removes the previous route (and the identifier thereof). When the modified origin parameter corresponds to the previous route, the server uses this information in order to delete an already passed segment from the route.

Step 7 is performed when the vehicle makes a detour or escapes from the route, when the vehicle moves from a previously reported point by a specific distance and/or when the vehicle enters a segment in which the server requests upload of the current position of the vehicle.

8. The server delivers the notification resource to the application using links to the modified resources including the trip and the route including the updated traffic information (traffic events and performance parameters).

8. The application accesses the newly proposed route along with the performance parameters and the traffic events. Since the application subscribes to the notification service for the trip resource, the subscription includes the newly proposed route.

9. When the server detects the traffic events on the proposed routes, severe traffic congestion and/or change of the position of the third party, the server sends notification using a uniform resource locator (URL) of the updated information.

10. The application accesses the update information of the used route, new traffic events and the proposed alternative routes. Since the subscription to the notification service includes all routes related to the trip, the notification extends to the proposed alternative route. When the position of the third party is changed, the application accesses the changed position of the third party and/or the updated route resource as a destination.

In such a lightweight ND service, sometimes, the route calculated by the server may be provided to a third party application (that is, a third party) instead of the application (that is, the user). For example, a method of providing the third party with a route from a third party to a specific destination (a fixed geographical position or a moving object—the position of the above-described application, that is, the moving user) is considered in order to provide a variety of navigation services or to improve user satisfaction/user experience.

In addition, in the method of providing the route to the third party, as described above, since the origin of the route is the third party and the destination is the fixed geographical position or the moving user, there are several considerations. In the present invention, a method of providing a route to a third party and a detailed method of solving several problems occurring in the method of providing the route to the third party are proposed.

DISCLOSURE

Technical Problem

An object of the present invention devised to solve the problem lies in a method for solving problems occurring in a service for providing a route to a third party.

The technical problems solved by the present invention are not limited to the above technical problems and other technical problems which are not described herein will become apparent to those skilled in the art from the following description.

Technical Solution

The object of the present invention can be achieved by providing a method of delivering a trip route identified by an origin and a destination calculated by a server to a third terminal, the method being performed by a terminal, the origin being a position of the third terminal defined by an identifier (ID) of the third terminal and the destination being a current position of the terminal, the method including requesting, to the server, delivery of a route to the third terminal, the route being delivered to the third terminal according to the request for delivery of the route, requesting, to the server, subscription to a notification service related to the third terminal, the notification service being configured to notify the terminal that specific operation of the third terminal has occurred, receiving notification that the specific operation of the third terminal has occurred from the server, when the specific operation of the third terminal occurs, and, if the notification indicates that the third terminal has requested reception of update information related to the route, transmitting an updated position of the terminal to the server when the terminal moves from a previously reported position by a predetermined distance.

Preferably, a new route from the third terminal to the terminal based on the updated position may be transmitted to the third terminal.

Preferably, the method may further include indicating whether the update information related to the route is provided to the third terminal.

Preferably, the method may further include setting a validity period in which a provision of the update information related to the route to the third terminal is permitted.

Preferably, the method may further include receiving notification that the third terminal has acquired the new route from the server, when the third terminal acquires the new route.

Preferably, the route or the update information related to the route may be delivered to the third terminal using a specific uniform resource locator (URL).

Preferably, the specific operation of the third terminal may include the request for reception of the update information related to the route and acquisition of the update information related to the route.

In another aspect of the present invention, provided herein is a method of delivering a trip route identified by an origin and a destination calculated by a server to a third terminal, the method being performed by the server, the origin being a position of the third terminal defined by an identifier (ID) of the third terminal and the destination being a current position of a terminal, the method including receiving a request for delivery of a route to the third terminal from the terminal, delivering the route to the third terminal according to the request for delivery of the route, creating a notification service configured to notify the terminal that specific operation of the third terminal has occurred, transmitting notification that the specific operation of the third terminal has occurred to the terminal, when the specific operation of the third terminal occurs, and receiving an updated position of the terminal from the terminal when the terminal moves from a previously reported position by a predetermined distance if the notification indicates that the third terminal has requested reception of update information related to the route.

Preferably, a new route from the third terminal to the terminal based on the updated position may be transmitted to the third terminal.

Preferably, the method may further include transmitting, to the terminal, notification that the third terminal has acquired the new route, when the third terminal acquires the new route.

Preferably, the method may further include delivering the route, information related to the route, or update information related to the route to the third terminal using a specific uniform resource locator (URL).

Preferably, the specific operation of the third terminal may include the request for reception of the update information related to the route and acquisition of the update information.

In another aspect of the present invention, provided herein is a terminal configured to deliver a trip route identified by an origin and a destination calculated by a server to a third terminal, the origin being a position of the third terminal defined by an identifier (ID) of the third terminal and the destination being a current position of the terminal, the terminal including a transceiver configured to communicate with the server and a processor configured to acquire update information of the route based on information received from the server, wherein the processor is configured to request, to the server, delivery of the route to the third terminal, the route being delivered to the third terminal according to the request for delivery of the route, request, to the server, subscription to a notification service related to the third terminal, the notification service being configured to notify the terminal that specific operation of the third terminal has occurred, receive notification that the specific operation of the third terminal has occurred from the server, when the specific operation of the third terminal occurs, and, if the notification indicates that the third terminal has requested reception of update information related to the route, transmit an updated position of the terminal to the server when the terminal moves from a previously reported position by a predetermined distance, wherein a new route from the third terminal to the terminal based on the updated position is transmitted to the third terminal.

In another aspect of the present invention, provided herein is a server configured to deliver a trip route identified by an origin and a destination calculated by a server to a third terminal, the origin being a position of the third terminal defined by an identifier (ID) of the third terminal and the destination being a current position of a terminal, the server including a transceiver configured to communicate with the server and a processor configured to create update information of the route based on information received from the terminal, wherein the processor is configured to receive a request for delivery of the route to the third terminal from the terminal, deliver the route to the third terminal according to the request for delivery of the route, create a notification service configured to notify the terminal that specific operation of the third terminal has occurred, transmit notification that the specific operation of the third terminal has occurred to the terminal, when the specific operation of the third terminal occurs, and receive an updated position of the terminal from the terminal when the terminal moves from a previously reported position by a predetermined distance if the notification indicates that the third terminal has requested reception of update information related to the route, wherein a new route from the third terminal to the terminal based on the updated position is transmitted to the third terminal.

It is to be understood that both the foregoing general description and the following detailed description are merely exemplary of the invention, and are intended to provide an overview or framework for understanding the nature and character of the invention as claimed.

Advantageous Effects

According to embodiments of the present invention, it is possible to reduce unnecessary data transmission and delivery which may occur between a navigation device (or an application) and a server and to increase service quality and/or quality of experience (QoE) of a user.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
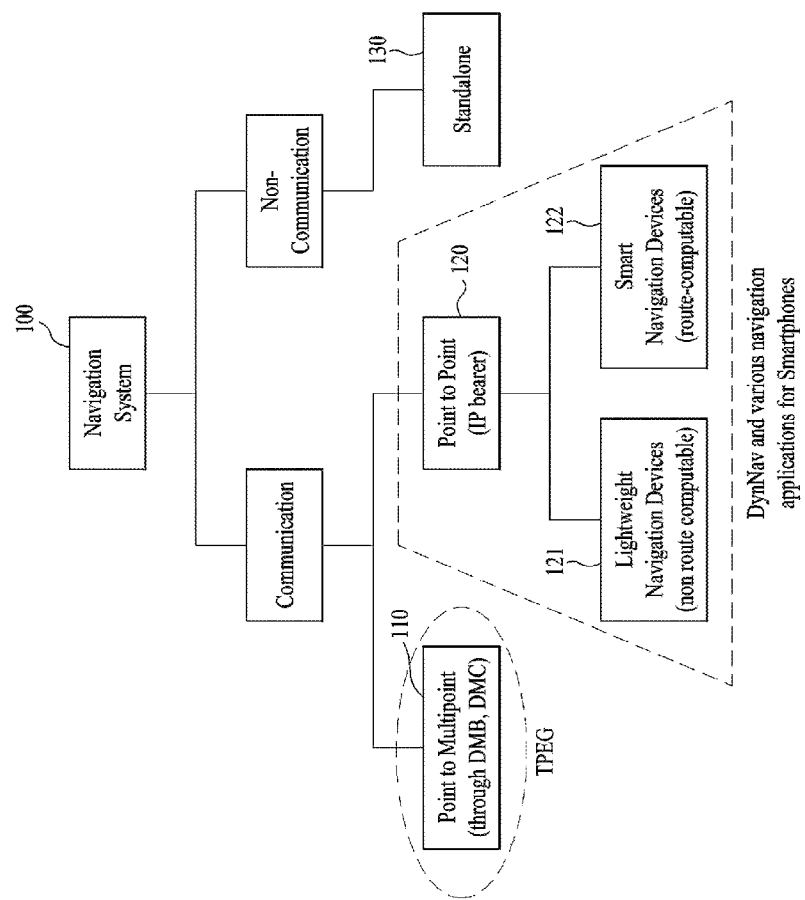
FIG. 1 is a diagram showing classification of a navigation device.
Figure 2:
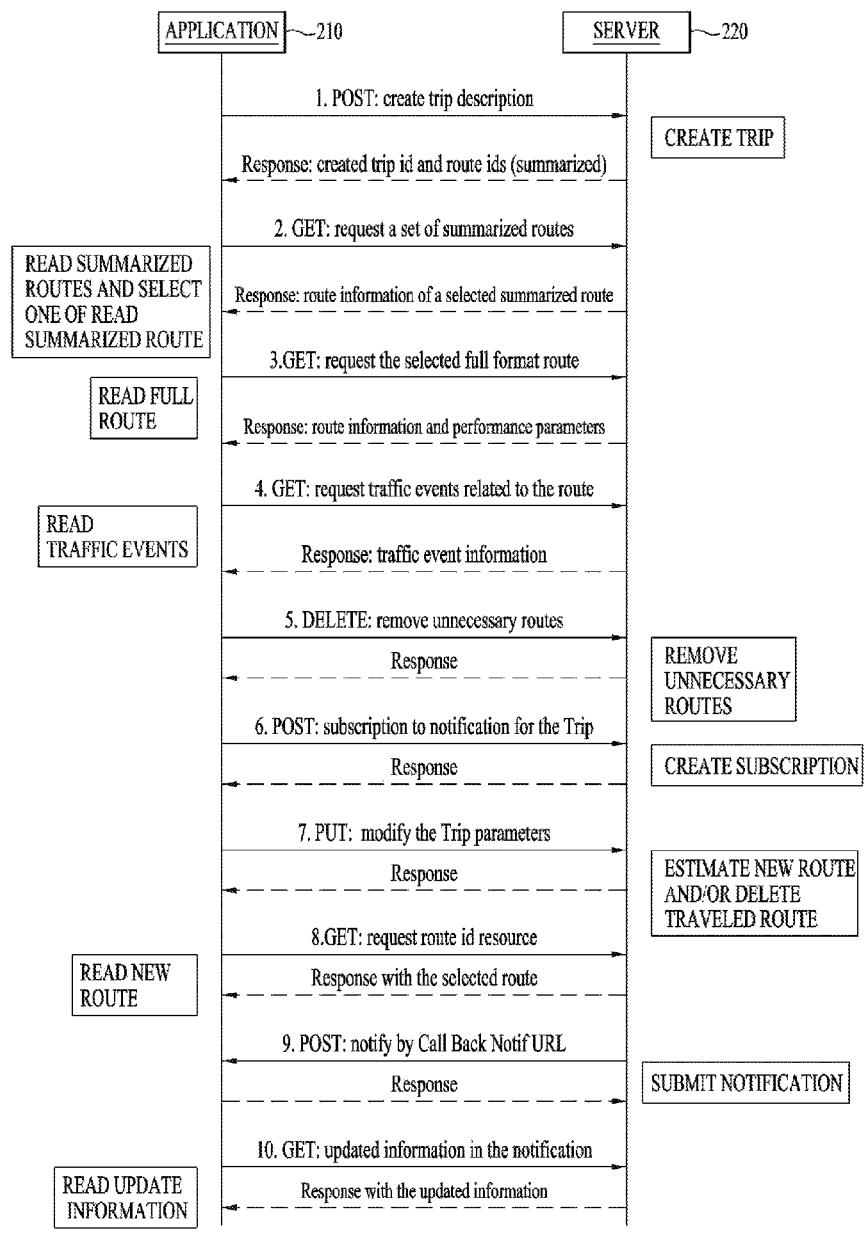
FIG. 2 is a flowchart showing operation of a lightweight ND in a conventional DynNav system.

Reference will now be made in detail to the preferred embodiments of the present invention with reference to the accompanying drawings. The detailed description, which will be given below with reference to the accompanying drawings, is intended to explain exemplary embodiments of the present invention, rather than to show only the embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Terms used herein will be defined as follows.

Application

An application is an implementation of a well-defined but not standardized set of functions that perform work on behalf of a user. The application may include software and/or hardware elements and associated user interfaces.

Server

In general, a server is an entity that provides resources to clients in response to requests in the technical field of the present invention.

Client

In general, a client is a device, user agent, or other entity that acts as a receiver of a service in the technical field of the present invention.

DynNav Application

A DynNav application is an entity that is in charge of interacting with a DynNav server to get optimal route(s), real-time and forecasted traffic information, and complementary data. Therefore, the DynNav application is loaded in a terminal such as a smartphone, a mobile phone, an ND, etc. Accordingly, the term DynNav application is interchangeably used with terminal. In this aspect, the DynNav application is a kind of client. In this description, the DynNav application is referred to as a source terminal or a target terminal, or a terminal. The source terminal is referred to a terminal requesting a target terminal location based-route setting service and the target terminal is referred to an entity corresponding to destination in the service.

DynNav Server

A DynNav is an entity that is in charge of providing optimal route(s), real-time and forecasted traffic information, and complementary data to the application. In this aspect, the DynNav server is a kind of server.

Location URI

A location Uniform Resource Identifier (URI) is a URI that enables the current location of a device to be obtained from a particular location server using a particular dereferencing protocol.

Navigation Device (ND)

An ND is an entity that assists a driver, showing a correct route using a Global Navigation Satellite System (GNSS) service to reach a final destination. This entity may process real-time and predicted traffic information and dynamically estimates the optimal route, according to user preferences.

Lightweight ND

A lightweight ND is a navigation device that does not have a route calculation function, requests a calculated route to a server, and receives information about the calculated route from the server. The lightweight ND accesses the server for route estimation functionalities and for retrieving roads shape representation, if not available in a local map database.

Smart ND

A smart ND is a navigation device that is able to calculate a route(s), using a road network database available on the device itself.

Point of Interest (POI)

A POI describes information about locations such as name, category, unique identifier, or civic address.

Segment

A segment is a unit into which a road is divided. For a general road, a road running between intersections is a segment, whereas for a highway, a road is divided into segments according to a policy for the highway. Traffic congestion or a passing time may be determined on a segment basis. In the specification, the term segment is interchangeably used with a road section.

Segment Sequence

A set consisting of one or more consecutive segments. If necessary, the segment sequence consisting of one segment is available. Also, an end point of the first segment of the segment sequence consisting of two or more segments is equal to a start point of the second segment of the segment sequence.

Polyline

A polyline is a continuous line used in graphic computing composed of one or more line segments, defined by specifying the endpoints of each segment.

Route Information

Route information is information about segment end points and complementary data from a defined origin and a destination.

Traffic Information

Traffic information is information including traffic events and network performance parameters related to an area or a route. Further, the traffic information may include current or upcoming, that is, future traffic information.

Traffic Event

A traffic event is information about events related to an area or a route that are either imposed or planned by a road network operator (i.e., road works leading to lane closures) or events that occur outside the control of the road network operator (i.e., accidents).

Network Performance Parameter

A network performance parameter is information regarding the performance (i.e., speed, delay, and travel time) of road segments related to an area or a route).

Route Information in Full Format

Route information in a full format is a type of route information including information about all segments from a origin to a destination. Unless specified otherwise, route information is about a whole route.

Route Information in Summarized Format

Route information in a summarized format is a kind of route information including only information about segments selected for a summary of information from among all segments of a route between an origin and a destination (how segments are to be selected is beyond the scope of the present invention).

Recently, as smartphones have come into widespread use, a navigation service for providing a movement route to a mobile communication terminal has been generalized in addition to use of an existing digital multimedia broadcasting (DMB) network. In the OMA Location Working Group (LOC WG), the above-described service is referred to as dynamic navigation (DynNav).

In the present specification, a navigation device refers to a device capable of performing a route guidance function and includes portable devices such as smartphones, mobile phones, mobile devices, laptops, tablet PCs or smart pads or all electronic devices capable of being attached to portable objects.

Figure 3:
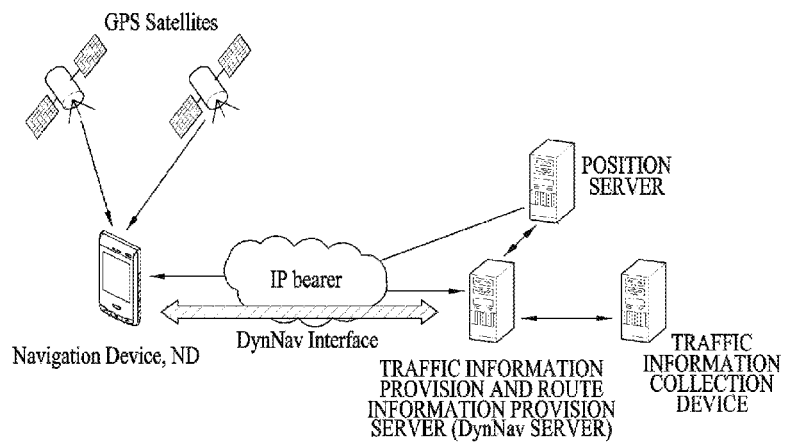
FIG. 3 is a diagram showing a network configuration illustrating an IP based DynNav system which is a navigation system of the present invention.

FIG. 3 illustrates a network configuration referred to for describing an Internet Protocol (IP)-based DynNav system being a navigation system according to the present invention. As illustrated in FIG. 3, the navigation system according to the present invention may include an ND that may be connected to a mobile communication network, a mobile communication network for wireless transmission and reception, a traffic information collector and a traffic information and route information providing server (i.e. a DynNav server), which provide traffic information, and a location server for generating and providing assistance data to locate an ND.

For simplicity of description, the traffic information and route information providing server or the DynNav server is referred to shortly as the "server". The navigation device is referred to shortly as the ND. According to the capability of an ND, the ND is referred to as the "smart ND" or "lightweight ND".

In the present invention, a terminal (two terminal types are available, as described before) may be connected to a mobile communication network or an IP network such as a Wireless Fidelity (Wi-Fi) network as illustrated in the figure. A corresponding application may access the server, receive route guidance data and real-time traffic information, and thus provide route guidance. While not shown, a terminal capable of calculating a route on its own may selectively receive only real-time traffic information without receiving route guidance data from the server.

The real-time traffic information refers to optimal route information calculated and transmitted to the terminal by the server, real-time and forecasted traffic information, and additional information related to traffic, such as POI and weather. To avoid representational redundancy, a navigation application or a terminal is collectively referred to as a terminal. Accordingly, the terms "terminal", "smart ND", "lightweight ND", and "navigation application" may be referred to uniformly as "terminal".

Figure 4:
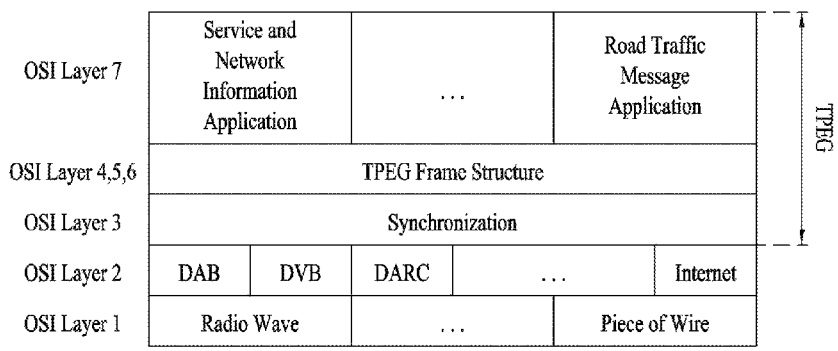
FIG. 4 is a diagram showing a hierarchical structure of a TPEG.

The afore-mentioned real-time traffic information may be represented in Transport Protocol Experts Group (TPEG) under consideration in the ISO standardization organization. TPEG is a standard protocol used to transmit traffic information and travel information over a digital broadcasting network. As illustrated in FIG. 4, a TPEG layer stack corresponds to the network layer (Layer 3; L3) to application layer (Layer 7; L7) of the ISO/OSI layer model. The network layer defines TPEG frame synchronization and routing. The packetization layer of Layers 4, 5, 6 (L4, L5, and L6) combines components of applications into one stream. Each message format corresponds to the application layer, L7. In DynNav, real-time traffic information may be provided to a terminal in a real-time traffic information representation scheme of TPEG or any other representation scheme.

Figure 5:
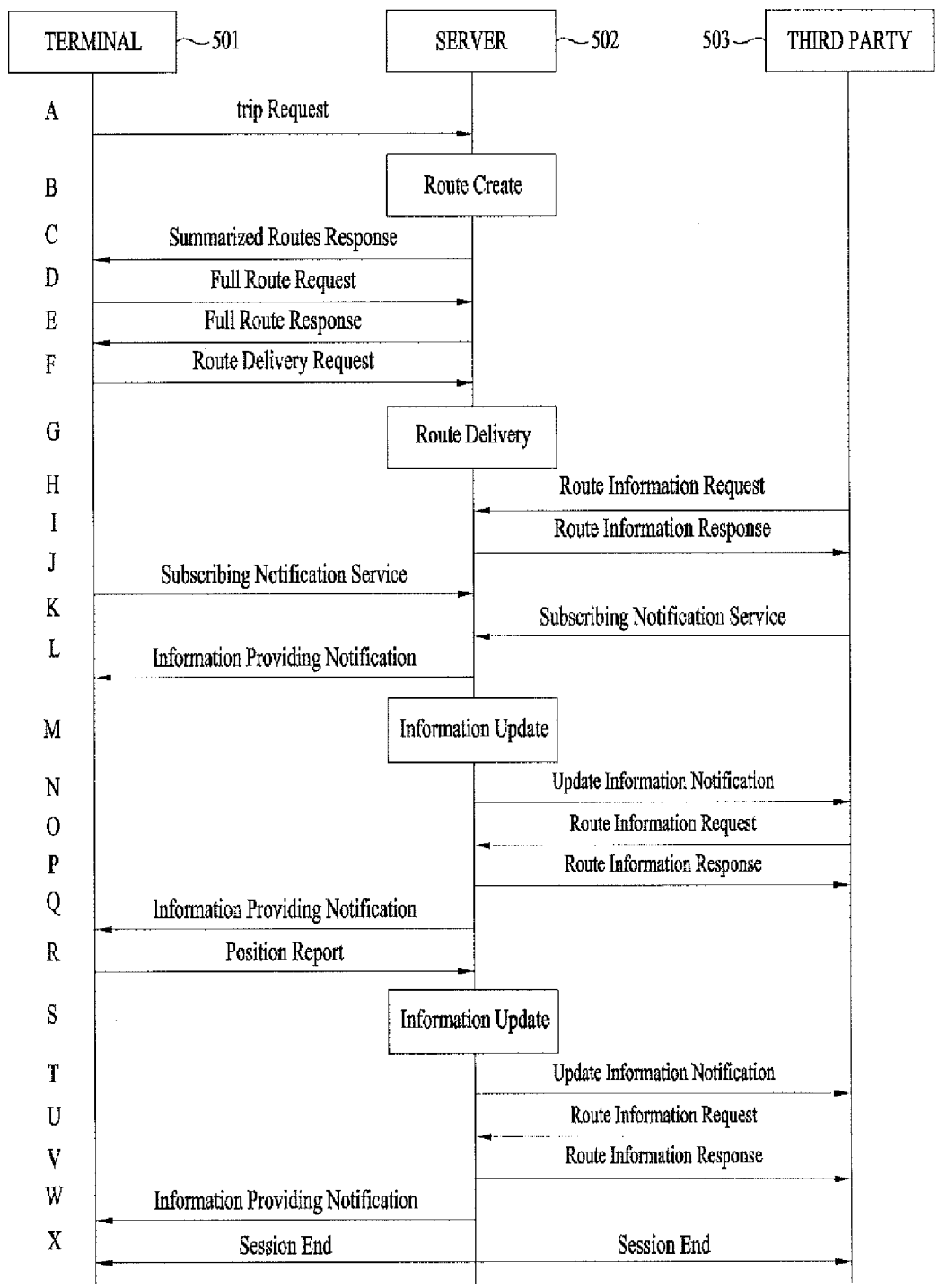
FIG. 5 is a flowchart of operation according to one embodiment of the present invention.

FIG. 5 is a flowchart of operation for providing a route to a third party according to one embodiment of the present invention. Assume that a terminal 501 of FIG. 5 corresponds to a lightweight ND and the terminal 501, a server 502 and a third terminal (that is, a third party) 503 all support DynNav.

One embodiment of the present invention may be largely divided into a procedure (A to F) of; at the terminal (user), requesting a service for delivering a route to the third party, a procedure (I to P) of, at the third party, receiving a route, and a procedure (N to T) of delivering an updated route to the third party and the terminal when the route is updated. The route is updated when the traffic conditions of the route provided by the third party become bad, when the state of the provided route becomes bad due to accidents/construction or when there is an alternative route for providing better performance (a route having a shorter time of arrival at a destination) than the provided route. When the destination of the route is the terminal and the position of the terminal is changed to require an alternative route, the route needs to be updated.

In addition, since the route provided by the third party may include the position information of the terminal, the terminal or the user may set whether the update information is provided to the third party for privacy protection of the user of the terminal and set a validity time of the provided information such that the user accesses the information only for a specific time.

The third party requests delivery of the update information (the alternative route or the changed trip information). Accordingly, the terminal may request, from the server, a notification service for determining whether the third party requests delivery of the update information or whether the information is received or acquired. When the destination of the route provided to the third party is the terminal, the terminal may determine whether the server is continuously notified of the changed position of the terminal and check information about the route, on which the third party currently is moving, without delay.

A detailed description will be given with reference to the flowchart of FIG. 5.

Step A. The terminal 501 requests delivery of the route to the third party 503 from the server 502. When requesting the route, an origin and a destination of the route are defined. The values of the origin and the destination may be changed according to the type of the provided route. The values of the origin and the destination according to the type of the provided route are summarized in the following table.

TABLE 6

|  | Route arriving at a user | Route arriving at a specific point |
| --- | --- | --- |
| Origin | ID of a third party | ID of a third party |
| Destination | Civic address or WGS 84 coordinates indicating the current position of the user | Civic address or WGS 84 coordinates of the specific point |

At this time, the terminal notifies the server of whether the update information of the route is provided to the third party. In the embodiment of FIG. 5, assume that the terminal permits provision of the update information to the third party.

Therefore, the following parameters are newly added.

TABLE 7

| Element | Type | Optional | Description |
| --- | --- | --- | --- |
| Origin-3rdParty | xsd:string | Choice | This indicates the ID of the third party to be used as the origin. The DynNav server acquires the position of the third party via an external location server and uses the position of the third party as the origin. |
| 3rdParty-Delivery | xsd:boolean | Yes | This indicates that the user requests a service for delivering a route to the third part from the DynNav server when this parameter is included and the value of this parameter is true. |

Step B. The server checks the position of the third party based on the ID of the third party received in step A. As the method of checking the position of the third party, various methods including a method of using an external location server (e.g., SUPL) may be used but are not described in this specification. The server creates one or more routes to be provided to the third party based on the origin (that is, the position of the third party acquired by the server) and the destination (the position of the terminal or a specific geographical position specified by the terminal) requested by the terminal, and creates summarized routes of the created routes.

Step C: The server delivers the summarized routes of the routes created in step B to the terminal.

Step D: The terminal selects a route to be delivered to the third party from among the summarized routes delivered in step C and notifies the server of the route to be delivered.

Step E: The server delivers the full route of the route selected in step D to the terminal.

Step F: The terminal requests, from the server, delivery of the route selected in step D to the third party. Upon request, settings for privacy protection of the user of the terminal may be further transmitted. At this time, the added parameters are as follows.

TABLE 8

| Element | Type | Optional | Description |
| --- | --- | --- | --- |
| 3rdPartyUpdateInfoPermission | xsd:boolean | Yes | This indicates whether the update information (trip and route information) of the informationprovided from the user to the third party is provided when the user requests delivery of the route to the third party. When this set to true, the update information is provided to the third party. |
| 3rdPartyStartValidityTime | xsd:dateTime | Yes | This indicates a start time of a validity time of the provided information when the user requests delivery of the route to the third party. |

TABLE 8-continued

| Element | Type | Optional | Description |
|---|---|---|---|
| 3rdParty-EndValidityTime | xsd:dateTime | Yes | This indicates an end time of a validity time of the provided information when the user requests delivery of the route to the third party. When the end time has elapsed, the server deletes related resources. |

Step G. The server delivers the full route of step E to the third party. In the method of delivering the full route to the third party, the server delivers an address (e.g., URL) capable of receiving the full route to the third party using an SMS, push notification, etc.

For example, the URL may be http://{serverRoot}/dynnav/{apiVersion}/{appId}/trips/{tripId}/routes/{routeId}. The third party may also receive trip information in addition to the route information via the address. The third party, which has received the address, accesses the addresses and receives the full route.

Step H. The third party requests the route information from the server via the address (URL) received in step G.

Step I. The server delivers the route information to the third party.

Step J. The terminal subscribes to a notification service for receiving notification of whether the third party has requested the update information of the route or whether the update information has been received. Upon subscribing to the notification service, the terminal may receive notification from the server in the following situations:

When the third party requests reception of the update information from the server When the third party receives the update information Step K. The third party requests delivery of the update information from the server in order to receive the update information of the acquired route from the server. (This step is performed only when the terminal permits delivery of the update information to the third party in step F. If the terminal does not permit delivery of the update information to the third party in step F, the server sends an error message upon the request of the third party. At this time, step L and subsequent steps thereof are not performed.)

Step L. The server notifies the terminal that the third party has requested the update information.

For the present invention, the parameters added to the notification are as follows.

TABLE 9

| Element | Type | Optional | Description |
|---|---|---|---|
| 3rdPartyUpdateRequest | xsd:boolean | Yes | This indicates that the server includes this parameter and notifies the user that the third party has requested reception of the update information, when the user has requested the service for delivering the route to the third party and the third party has requested the update information from the server after receiving the created route information. |

Step M. When the traffic conditions of the provided route become bad and performance of the route provided in step I deteriorates, the server detects performance deterioration of the route and calculates an alternative route.

Step N. The server notifies the third party that the alternative route has been created.

Step O. The third party requests the alternative route calculated in step M from the server.

Step P. The server delivers the alternative route calculated in step M to the third party.

Step Q. The server notifies the terminal that the third party has acquired the updated route information (alternative route). At this time, an address (URL) capable of receiving the delivered alternative route is also delivered to the terminal.

For the present invention, the parameters added to the notification are as follows.

TABLE 10

| Element | Type | Optional | Description |
|---|---|---|---|
| 3rdPartyUpdateProviding | xsd:boolean | Yes | This parameter included to notify the user that the third party has acquired the updated route information, when the user has requested the service for delivering the route to the third party and the third party has acquired the updated route information. (At this time, the parameter is set to true.) |

Steps M to Q are performed when the performance of the route delivered to the third party deteriorates. When the performance of the delivered route does not deteriorate, steps M to Q are not performed. In addition, this procedure may be performed once more according to traffic conditions.

Step R. If the destination of the route delivered to the third party is the position of the terminal and the third party requests reception of the update information of the route, the terminal notifies the server of the changed position thereof when the terminal moves from a previously reported point by a predetermined distance or more.

Step S. The server, which has received the changed position of the terminal, checks the current position of the third party. The server creates a new (alternative) route by regarding the current position of the third party as an origin and regarding the changed position of the terminal as a new destination.

Step T. The server notifies the third party that the new route has been created.

Step U. The third party requests the new route calculated in step S from the server.

Step V. The server delivers the new route calculated in step S to the third party.

Step W. The server notifies the terminal that the third party has acquired the update information (that is, the new information). At this time, an address (URL) capable of receiving the delivered alternative route is also delivered to the terminal.

Steps R to W are performed when the destination of the route provided by the third party is the terminal and the terminal has moved from the previously reported point by the predetermined distance and then reports the position thereof to the server, Steps R to W may not be performed (when the user does not move) or may be performed once or more according to movement of the user.

Step X. The third party may reach the destination according to the new route. The server may notify the terminal of end of the session.

According to the above-described embodiment, reception of the update information of the route by the third party is possible only when the terminal permits provision of the update information to the third party, regardless of the reception request of the third party.

In addition, if the terminal sets the validity time of the update information provided to the third party, the server no longer provides related information to the third party when the validity time has elapsed.

The terminal may subscribe to the notification service for receiving notification of the update information request of the third party and provision of the update information and check the current route, on which the third party moves, without delay. In addition, if the destination of the route is the terminal, when the terminal has moved by the predetermined distance, whether the position information of the terminal is provided to the server may be determined. This may prevent the position of the terminal from being unnecessarily uploaded to the server, thereby reducing data traffic between the server and the terminal.

Figure 6:
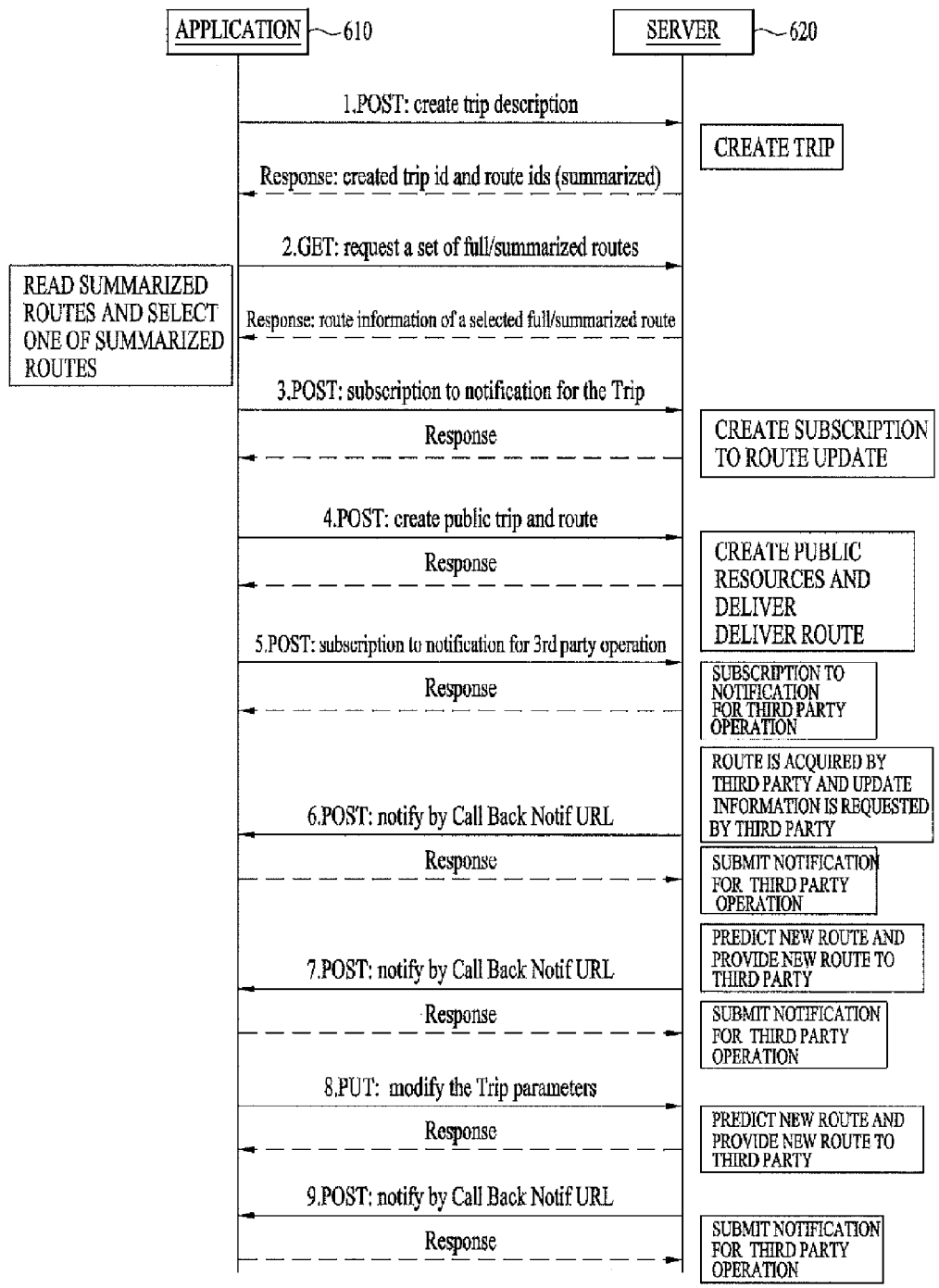
FIG. 6 is a diagram showing an example of the embodiment related to FIG. 5.

FIG. 6 shows operation for providing a route to a third party according to one embodiment of the present invention. FIG. 6 shows only operation between a terminal and a server except for the third party, unlike FIG. 5.

Operation of FIG. 6 relates to a scenario in which a DynNav application (e.g., a terminal) requests a DynNav server (hereinafter, referred to as a server) to deliver route information to the third party. The main functions of this scenario include (1) delivery of a summarized route and/or a full route, (2) selection of a route and delivery of route information to the third party, (3) subscription of the terminal to a notification service, (4) report of a current position of the terminal, (5) re-calculation (a) in case of severe congestion on the proposed route and (b) in the case in which a destination is the terminal and the position of the terminal is changed.

The user of the terminal defines trip parameters based on an origin, a destination and preferences and such parameters are immediately transmitted from the terminal to the server. The origin may be defined using the ID of the third party, the server may acquire the position of the third party via an external position application (server), and the position of the third party may be used as the origin. The destination may be a specific place (that is, a fixed geographical position) or the current position of the terminal. When the destination is the current position of the terminal, the terminal may provide the position thereof to the server as the destination. The server sends a set of routes matching trip parameters as a response in consideration of real-time and estimated traffic information. For bandwidth optimization, the routes are available in the server in two different formats, that is, summarized and full formats. The terminal accesses the summarized route and the user of the terminal may select a route to be delivered to the third party from among the proposed routes using this information. The terminal may request the full route information of the selected route. Due to a limited length, trip complexity and network performances, the proposed routes may be immediately encoded into the full route upon startup and, in this case, the server may not encode the summarized route.

When the user of the terminal selects the full route, the terminal may request sharing of the selected route information from the server via dedicated public resources and the server may deliver the URL of the public resources including trip and route information to the third party using an external application. When the URL of the public resources is received, the third party may access the public resources in order to acquire the trip and route information. The third party may request updated information (trip and resource information) from the server via a long polling COMET mechanism.

Due to traffic congestion on the provided route, the server may create an alternative route and alternative route information may be uploaded to the dedicated public resources. When a GET operation for acquiring the updated information is performed by the third party, the alternative route information may be delivered to the third party as a response to the GET operation. Update of the public resources may be triggered by the application or automatically performed by the server according to settings of the public resource parameters.

When the destination of the trip is the position of the terminal and the terminal moves by a specific distance, the terminal may report the position thereof to the server. In this case, the server may acquire the position of the third party and the server may calculate a new route based on the reported position of the terminal and the acquired position of the third party. The new information is uploaded to the dedicated public resources describing the trip and route and may be delivered to the third party via the public resources as described above.

For privacy protection of the user of the terminal, the terminal may indicate whether provision of the update information is permitted. In addition, the terminal may define a validity period when the third party can access the update information. The terminal may subscribe to a notification service for checking whether the third party requests reception of the update information and/or whether the third party has acquired the update information.

A more detailed description will be given with reference to FIG. 6.

1. For delivery of the route information to the third party, the terminal may create a trip including specific trip parameters (the position of the third party as an origin, a destination, etc.) using a POST operation command. The server may propose a set of routes to be delivered and send "trip" resources including route identifiers of the proposed routes as a response.

2. The terminal may access a set of summarized routes using a GET operation command. This step may be repeated with respect to all routes proposed by the server. However, when the length and complexity of the trip are restricted or network quality is sufficient, full format route information may be used in this step.

The user of the terminal may select one route from the proposed set to be delivered to the third party and the terminal may delete unnecessary routes not to be delivered to the third party. However, in order to simplify a sequence and focus on main functions, a step of deleting the unnecessary routes is omitted.

3. The terminal may subscribe to a notification service for receiving update information of alternative route information of the selected route (using a POST operation command).

4. The terminal may request the server to deliver trip and route information to the third party via the public resources using the PSOT operation command. The terminal may indicate whether provision of the update information of the route to the third party is permitted. The server may automatically create the public resources and the server may deliver the URL for acquiring the selected route information to the third party using an external application (e.g., OMA PUSH, MMS or SMS).

5. The terminal may request subscription to the notification service in order to check operation of the third party. The terminal may receive the notification from the server in the following cases.

a. when the third party requests reception of the update information (or the route information)

b. when the third party acquires (retrieves) the update information (or the route information)

6. When the third party acquires the route information and requests the update information, the server may notify the terminal that the third party has requested reception of the update information related to the route information (e.g., using a POST operation command).

7. When the third party requests reception of the update information from the server and the server detects traffic events or severe congestion on the proposed route, the server may create an alternative route and deliver a URL for acquiring the update information of the alternative route to the third party. When the third party acquires the update information of the alternative route (e.g., using a GET operation command), the server may notify the terminal that the third party has acquired the update information of the alternative route (e.g., using a POST operation command).

8. If the third party requests reception of the update information from the server and the terminal receives notification that the third party has requested reception of the update information from the server, the terminal may change a destination parameter in trip resources in order to update the current position thereof on the server when moving from a previously reported point by a predetermined distance. When the server recognizes that the destination has been changed, the server may acquire the current position of the third party. The server may calculate a new route using the updated position of the terminal as a destination and using the acquired position of the third party as an origin and deliver the URL of the information about the new route to the third party.

9. When the third party requests reception of the update information from the server and acquires the new route (update information), the server may notify the terminal that the third party has acquired the information about the new route (using a POST operation command).

After steps 7 and 9, the terminal may access the update information (e.g., using a GET operation command). However, the step of accessing such update information is omitted in order to simplify the sequence and focus on main functions.

Hereinafter, embodiments of the present invention will be described in greater detail.

Case in which an Origin is the Position of a Third Party and a Destination is a Specific Place Assume that a user visits a specific place, for example, a restaurant and recommends the specific place to another user. The user may deliver a specific route having the current position of another user as an origin and the position of the restaurant as a destination to another user and request delivery of the specific route from the server.

In the present embodiment, assume that the specific route having the origin and the destination is created by the server in advance and is already shared with the terminal.

When the request is received, the server may deliver the specific route to another user. Such delivery enables another user to access a specific address (e.g., a URL) to acquire the specific route using the specific address.

The terminal may request subscription to a notification service for specific information from the server. The notification service for the specific information means notification related to whether another user has requested reception of update information of the specific route and/or whether another user has acquired information about the specific route. Accordingly, when another user has acquired the specific route provided by the server, the server may notify the terminal that another user has acquired the specific route. Therefore, the terminal may recognize the route of another user.

Route re-calculation performed by the server may be repeated according to the traffic conditions on the specific route (or the alternative route) and/or movement of another user and thus information acquisition of another user and notification thereof may be repeated. Via such a process, it is possible to provide another user with an optimized route to the destination.

Case in which an Origin is the Position of a Third Party and a Destination is the Position of a Terminal When a user wants another user to tag along, for example, when two users are planning to meet each other but a meeting point is not specified, the user may provide another user with a specific route having the position of the user as a destination. The user may deliver a specific route having the current position of another user as an origin and the position of the user as a destination to another user and request delivery of the specific route from the server.

In the present embodiment, assume that the specific route having the origin and the destination is created by the server in advance and is already shared with the terminal.

When the request is received, the server may deliver the specific route to another user. Such delivery enables another user to access a specific address (e.g., a URL) to acquire the specific route using the specific address.

The terminal may request subscription to a notification service for specific information from the server. The notification service for the specific information means notification related to whether another user has requested reception of update information of the specific route and/or whether another user has acquired information about the specific route. Accordingly, when another user has acquired the specific route provided by the server, the server may notify the terminal that another user has acquired the specific route. Therefore, the terminal may recognize the route of another user.

In addition, when another user requests reception of update information of the specific route from the server, the server may notify the terminal that another user has requested reception of update information of the specific route. When the terminal is notified that another user has requested reception of update information of the specific route, the terminal reports the position thereof to the server when moving from a previously reported point by a predetermined distance, in order to create an alternative route according to movement of the terminal. When such a notification service is not provided, the terminal may not determine whether the position thereof is reported to the server periodically or according to a specific rule or may unconditionally report the position thereof even when another user does not request reception of the update information of the specific route from the server and thus the report is unnecessary.

Route re-calculation performed by the server may be repeated according to the traffic conditions on the specific route (or the alternative route) and/or movement of another user and thus information acquisition of another user and notification thereof may be repeated. Via such a process, it is possible to provide another user with an optimized route to the destination.

Figure 7:
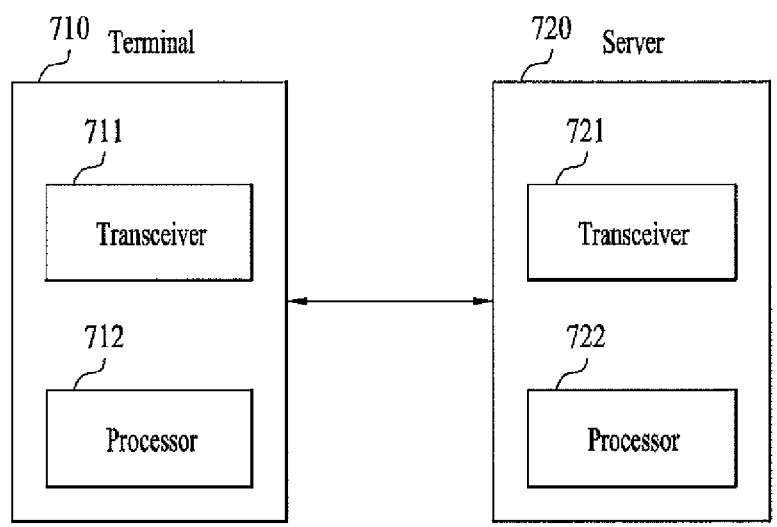
FIG. 7 is a block diagram showing a device in which the embodiments of the present invention may be implemented.

FIG. 7 is a block diagram of a terminal and a server configured to implement the embodiments of the present invention. The terminal 710 may include a transceiver 711 configured to communicate with the server 720 and a processor 712 configured to acquire update information of a route based on information received from the server. The server 720 may include a transceiver 721 configured to communicate with the terminal and a processor 722 configured to create the update information of the route based on information received from the terminal.

In the embodiment of the present invention described with reference to FIG. 7, the terminal 710 is a lightweight ND. In this embodiment, the origin of the route is the position of a third terminal defined using an ID of the third terminal and the destination of the route is the current position of the terminal. In this embodiment, the processor 712 is configured to request delivery of the route to the third terminal from the server. At this time, the route is delivered to the third terminal according to the request for route delivery. The processor is configured to subscribe to a notification service related to the third terminal, and the notification service is set to notify the terminal that specific operation of the third terminal occurs. The processor is configured to receive, from the server, notification that the specific operation of the third terminal has occurred, when the specific operation of the third terminal occurs. If the notification indicates that the third terminal has requested reception of the update information of the route, the processor is configured to transmit the updated position of the terminal to the server when the terminal moves from a previously reported position by a predetermined distance.

The processor 712 may be configured to indicate whether the update information of the route is provided to the third terminal. In addition, the processor 712 may be configured to set a validity period for permitting provision of the update information of the route to the third terminal.

When the terminal transmits the position thereof to the server, the server may be configured to calculate a new route using the updated position of the terminal and to deliver the calculated new route to the third terminal.

When the third terminal acquires the calculated new route, the processor 712 may be configured to receive, from the server, notification that the calculated new route has been acquired.

In addition, the route, the information related to the route or the update information may be delivered to the third terminal using a specific URL.

The specific operation of the third terminal may include a request for reception of the information related to the route or update information and/or acquisition of the update information.

In one embodiment of the present invention, the processor 722 of the server may be configured to receive the request for delivery of the route to the third terminal from the terminal, to deliver the route to the third terminal according to the request for delivery of the route, to create a notification service set to notify the terminal that specific operation of the third party occurs, to transmit notification that the specific operation of the third terminal has occurred to the terminal when the specific operation of the third terminal occurs, and to receive the updated position of the terminal from the terminal when the terminal moves from a previously reported position by a predetermined distance if the notification indicates that the third terminal has requested reception of the update information of the route.

For the description of the processor 722 of the server, refer to at least one of the above-described embodiments.

The terminal or the server may perform any one of the above-described embodiments or a combination of two or more of the above-described embodiments.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a navigation device or server.

The invention claimed is:

1. A method of delivering a route identified by an origin and a destination calculated by a server to a first terminal, the method being performed by a second terminal, the origin being a position of the first terminal and the destination being a current position of the second terminal, the method comprising:
   requesting, by the second terminal to the server, delivery of the route to the first terminal, the route being delivered to the first terminal according to the request for delivery of the route,
   wherein the route delivered to the first terminal is calculated by the server;
   requesting, by the second terminal to the server, a subscription to a notification service related to the first terminal, the notification service being configured to notify the second terminal that specific operation of the first terminal has occurred;
   receiving, by the second terminal, a notification that the specific operation of the first terminal has occurred from the server, when the specific operation of the first terminal occurs; and
   when the notification indicates that the first terminal has requested reception of update information related to the route, transmitting, by the second terminal, an updated position of the second terminal to the server when the second terminal moves from a previously reported position by a predetermined distance,
   wherein a new route from the first terminal to the second terminal based on the updated position is transmitted to the first terminal,
   wherein the new route transmitted to the first terminal is calculated by the server based on the updated position.

2. The method according to claim 1, further comprising indicating, by the second terminal, whether the update information related to the route is provided to the first terminal.

3. The method according to claim 2, further comprising setting, by the second terminal, a validity period in which a provision of the update information related to the route to the first terminal is permitted.

4. The method according to claim 1, further comprising receiving, by the second terminal, notification that the first terminal has acquired the new route from the server, when the first terminal acquires the new route.

5. The method according to claim 1, wherein the route or the update information related to the route is delivered to the first terminal using a specific uniform resource locator (URL).

6. The method according to claim 1, wherein the specific operation of the first terminal includes the request for reception of the update information related to the route.

7. A method of delivering a route identified by an origin and a destination calculated by a server to a first terminal, the method being performed by the server, the origin being a position of the first terminal and the destination being a current position of a second terminal, the method comprising:

calculating, by the server, the route from the origin to the destination, receiving, by the server, a request for delivery of the route to the first terminal from the second terminal, delivering, by the server, the route to the first terminal according to the request for delivery of the route;

creating, by the server, a notification service that notifies the second terminal that specific operation of the first terminal has occurred when a request for a subscription to the notification service related to the first terminal is received from the first terminal, wherein the notification service being configured to notify the second terminal that specific operation of the first terminal has occurred;

transmitting, by the server, a notification that the specific operation of the first terminal has occurred to the second terminal, when the specific operation of the first terminal occurs; and receiving, by the server, an updated position of the second terminal from the second terminal when the second terminal moves from a previously reported position by a predetermined distance when the notification indicates that the first terminal has requested reception of update information related to the route, calculating, by the server, a new route based on the updated position, wherein the new route from the first terminal to the second terminal based on the updated position is transmitted to the first terminal.

8. The method according to claim 7, further comprising transmitting, by the server to the second terminal, notification that the first terminal has acquired the new route, when the first terminal acquires the new route.

9. The method according to claim 7, further comprising delivering, by the server, the route, information related to the route, or update information related to the route to the first terminal using a specific uniform resource locator (URL).

10. The method according to claim 8, wherein the specific operation of the first terminal includes the request for reception of the update information related to the route.

11. A second terminal that delivers a route identified by an origin and a destination calculated by a server to first terminal, the origin being a position of the first terminal and the destination being a current position of the second terminal, the second terminal comprising:

a transceiver that communicates with the server; and
a processor that:
acquires update information of the route based on information received from the server, requests, to the server, delivery of the route to the first terminal, the route being delivered to the first terminal according to the request for delivery of the route, wherein the route delivered to the first terminal is calculated by the server;

requests, to the server, a subscription to a notification service related to the first terminal, the notification service being configured to notify the second terminal that specific operation of the first terminal has occurred;

receives, from the server, a notification that the specific operation of the first terminal has occurred from the server, when the specific operation of the first terminal occurs; and when the notification indicates that the first terminal has requested reception of update information related to the route, transmits, to the server, an updated position of the second terminal when the second terminal moves from a previously reported position by a predetermined distance, wherein a new route from the first terminal to the second terminal based on the updated position is transmitted to the first terminal, wherein the new route transmitted to the first terminal is calculated by the server based on the updated position.

12. A server that delivers a route identified by an origin and a destination calculated by a server to a first terminal, the origin being a position of the first terminal and the destination being a current position of a second terminal, the server comprising:

a transceiver that communicates with the first and second terminals; and
a processor that:
calculates the route from the origin to the destination,
creates update information of the route based on information received from the second terminal,
receives a request for delivery of the route to the first terminal from the second terminal,
delivers the route to the first terminal according to the request for delivery of the route;
creates a notification service that notifies the second terminal that specific operation of the first terminal has occurred when a request for a subscription to the notification service related to the first terminal is received from the first terminal, wherein the notification service being configured to notify the second terminal that specific operation of the first terminal has occurred;
transmits a notification that the specific operation of the first terminal has occurred to the second terminal, when the specific operation of the first terminal occurs; and
receives an updated position of the second terminal from the second terminal when the second terminal moves from a previously reported position by a predetermined distance when the notification indicates that the first terminal has requested reception of update information related to the route,
calculates a new route based on the updated position,
wherein the new route from the first terminal to the second terminal based on the updated position is transmitted to the first terminal.

* * * * *